United States Patent
Dindar et al.

(10) Patent No.: US 9,810,178 B2
(45) Date of Patent: Nov. 7, 2017

(54) EXHAUST NOZZLE WITH NON-COPLANAR AND/OR NON-AXISYMMETRIC SHAPE

(71) Applicant: General Electric Company, Schenectady, NY (US)

(72) Inventors: Mustafa Dindar, Cincinnati, OH (US); Scott Andrew Burton, Cincinnati, OH (US); Keith Edward James Blodgett, Milford, OH (US); Richard David Cedar, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 14/818,596

(22) Filed: Aug. 5, 2015

(65) Prior Publication Data

US 2017/0037813 A1  Feb. 9, 2017

(51) Int. Cl.
| | |
|---|---|
| F02K 1/78 | (2006.01) |
| F02K 3/06 | (2006.01) |
| F01D 25/24 | (2006.01) |
| F02K 1/09 | (2006.01) |
| F02K 1/00 | (2006.01) |
| F02K 1/06 | (2006.01) |
| F02K 1/08 | (2006.01) |

(52) U.S. Cl.
CPC ............ *F02K 1/78* (2013.01); *F01D 25/24* (2013.01); *F02K 1/00* (2013.01); *F02K 1/06* (2013.01); *F02K 1/08* (2013.01); *F02K 1/09* (2013.01); *F02K 3/06* (2013.01)

(58) Field of Classification Search
CPC ...... F02K 1/00; F02K 1/08; F02K 1/78; F02K 1/06; F02K 1/09; F01D 25/24; F02C 3/06
See application file for complete search history.

(56) References Cited

U.S. PATENT DOCUMENTS

| | | |
|---|---|---|
| 2,590,272 A | 3/1952 | Robertson et al. |
| 2,601,963 A | 7/1952 | Boutelle |
| 2,683,962 A | 7/1954 | Griffith |
| 3,019,601 A | 2/1962 | Sens |
| 3,080,711 A | 3/1963 | Connors |

(Continued)

FOREIGN PATENT DOCUMENTS

| | | |
|---|---|---|
| GB | 933009 | 7/1963 |
| GB | 2071769 A | 9/1981 |

(Continued)

OTHER PUBLICATIONS

U.S. Non-Final Office Action issued in connection with Related U.S. Appl. No. 12/198,959 dated Jun. 21, 2011.

(Continued)

*Primary Examiner* — Steven Sutherland
*Assistant Examiner* — Thuyhang Nguyen
(74) *Attorney, Agent, or Firm* — General Electric Company; Pamela A. Kachur (57) ABSTRACT

A turbofan exhaust nozzle includes: a conical inner shell disposed coaxially inside a surrounding outer shell to define an annular flow duct therebetween terminating in an outlet at a trailing edge of the outer shell and the inner shell terminates in a trailing edge aft of the outlet; and a pylon interrupting circumferentially the duct, wherein at least a portion of the trailing edge of the outer shell is vertically non-coplanar.

14 Claims, 7 Drawing Sheets

(56) References Cited

U.S. PATENT DOCUMENTS

| | | |
|---|---|---|
| 3,094,072 A | 6/1963 | Parilla |
| 3,512,716 A | 5/1970 | Kopp |
| 3,678,692 A | 7/1972 | Heise |
| 3,705,688 A | 12/1972 | Smale |
| 3,765,623 A | 10/1973 | Donelson et al. |
| 3,806,067 A | 4/1974 | Kutney |
| 4,280,660 A | 7/1981 | Wooten, Jr. et al. |
| 4,410,150 A | 10/1983 | Lahti |
| 4,466,587 A | 8/1984 | Dusa et al. |
| 4,802,629 A | 2/1989 | Klees |
| 5,058,379 A | 10/1991 | Lardellier |
| 5,058,617 A | 10/1991 | Stockman et al. |
| 5,251,435 A | 10/1993 | Pauley |
| 5,369,954 A | 12/1994 | Stuart |
| 5,833,140 A | 11/1998 | Loffredo et al. |
| 5,863,014 A | 1/1999 | Standish |
| 5,930,991 A | 8/1999 | Fournier et al. |
| 6,516,606 B2 | 2/2003 | Fournier et al. |
| 6,708,711 B2 | 3/2004 | Surply et al. |
| 6,820,410 B2 | 11/2004 | Lair |
| 6,969,028 B2 | 11/2005 | Dun |
| 7,107,756 B2 | 9/2006 | Rolt |
| 7,165,744 B2 | 1/2007 | Howarth et al. |
| 2008/0000235 A1 | 1/2008 | Hanson |
| 2008/0053061 A1 | 3/2008 | McCall |
| 2009/0301056 A1 | 12/2009 | Hatrick |
| 2010/0050651 A1* | 3/2010 | Dindar ................ B64D 33/04 60/770 |
| 2013/0232948 A1 | 9/2013 | Mengle |
| 2015/0330254 A1* | 11/2015 | Weiner ................ B64D 33/04 60/772 |

FOREIGN PATENT DOCUMENTS

| | | |
|---|---|---|
| JP | 56143330 A | 11/1981 |
| JP | 2008057540 A | 3/2008 |

OTHER PUBLICATIONS

U.S. Final Office Action issued in connection with Related U.S. Appl. No. 12/198,959 dated Oct. 24, 2011.

European Search Report and Opinion issued in connection with Related EP Application No. 09167793.0 dated Mar. 12, 2013.

Unofficial English Translation of Japanese Office Action issued in connection with Related JP Application No. 2009192704 dated Jun. 25, 2013.

Canadian Office Action issued in connection with Related CA Application No. 2675907 dated May 4, 2015.

U.S. Notice of Allowance issued in connection with Related U.S. Appl. No. 12/198,959 dated May 13, 2015.

GE Related Case Form.

* cited by examiner

EXHAUST NOZZLE WITH NON-COPLANAR AND/OR NON-AXISYMMETRIC SHAPE

BACKGROUND OF THE INVENTION

The present invention relates generally to gas turbine engines, and, more specifically, to exhaust nozzles in turbofan aircraft engines.

In a gas turbine engine, air is pressurized in a compressor and mixed with fuel in a combustor for generating hot combustion gases from which energy is extracted in turbine stages. A high pressure turbine (HPT) follows the combustor and extracts energy from the combustion gases for powering the compressor. A low pressure turbine (LPT) follows the HPT and extracts additional energy from the gases for powering an upstream fan in an exemplary turbofan aircraft engine application.

Modern turbofan aircraft engines have undergone decades of continuing development for maximizing aero dynamic efficiency while minimizing weight thereof, and for also achieving long useful life. Engine efficiency may be simply evaluated by specific fuel consumption (SFC) in which fractionally small improvements thereof are significant in reducing fuel consumption of the engine when powering the aircraft in flight.

The typical turbofan engine includes an annular fan nozzle which discharges the pressurized fan air for producing a majority of the propulsion thrust. A core nozzle follows the fan nozzle and discharges the spent combustion gases which add to the propulsion thrust.

The aerodynamic design of the fan and core nozzles is also subject to continuing development for further increasing aerodynamic efficiency thereof, including corresponding thrust coefficients.

The typical exhaust nozzle includes an annular outlet duct that converges to a throat of minimum flow area, which throat affects performance of the upstream components. The exhaust nozzles are typically axisymmetrical about the longitudinal or axial centerline axis of the engine for maximizing performance and efficiency under conventional design practices.

However, the aircraft engine must be suitably mounted in the aircraft and this is typically accomplished by a supporting pylon that provides a frame to which the engine is rigidly attached.

The typical wing pylon supports the engine vertically under the aircraft wing with the pylon occupying the twelve o'clock circumferential position of the engine.

The fan nacelle is typically formed in two circumferential halves typically referred to as C-ducts for allowing the nacelle to be opened in clamshell fashion for accessing the core engine during maintenance outages. In this configuration of the turbofan engine, a lower bifurcation or longitudinal beam is located at the bottom or six o'clock position of the engine.

Accordingly, the upper pylon and lower beam typically interrupt the circumferential continuity of the annular fan duct and the fan nozzle. The fan exhaust is therefore discharged from the fan nozzle in two discrete C-duct portions for collectively providing propulsion thrust.

However, the introduction of the upper and lower bifurcations correspondingly affects the circumferential continuity of the velocity and pressure distributions of the pressurized fan air which correspondingly reduces aerodynamic performance and efficiency of the nozzle.

Accordingly, it is desired to provide an exhaust nozzle having improved efficiency notwithstanding circumferential interruptions thereof.

BRIEF DESCRIPTION OF THE INVENTION

A turbine exhaust nozzle includes an inner shell disposed coaxially inside an outer shell to define a flow duct terminating in an outlet at a trailing edge of the outer shell. The inner shell and/or the inner shell may vary circumferentially around the duct.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
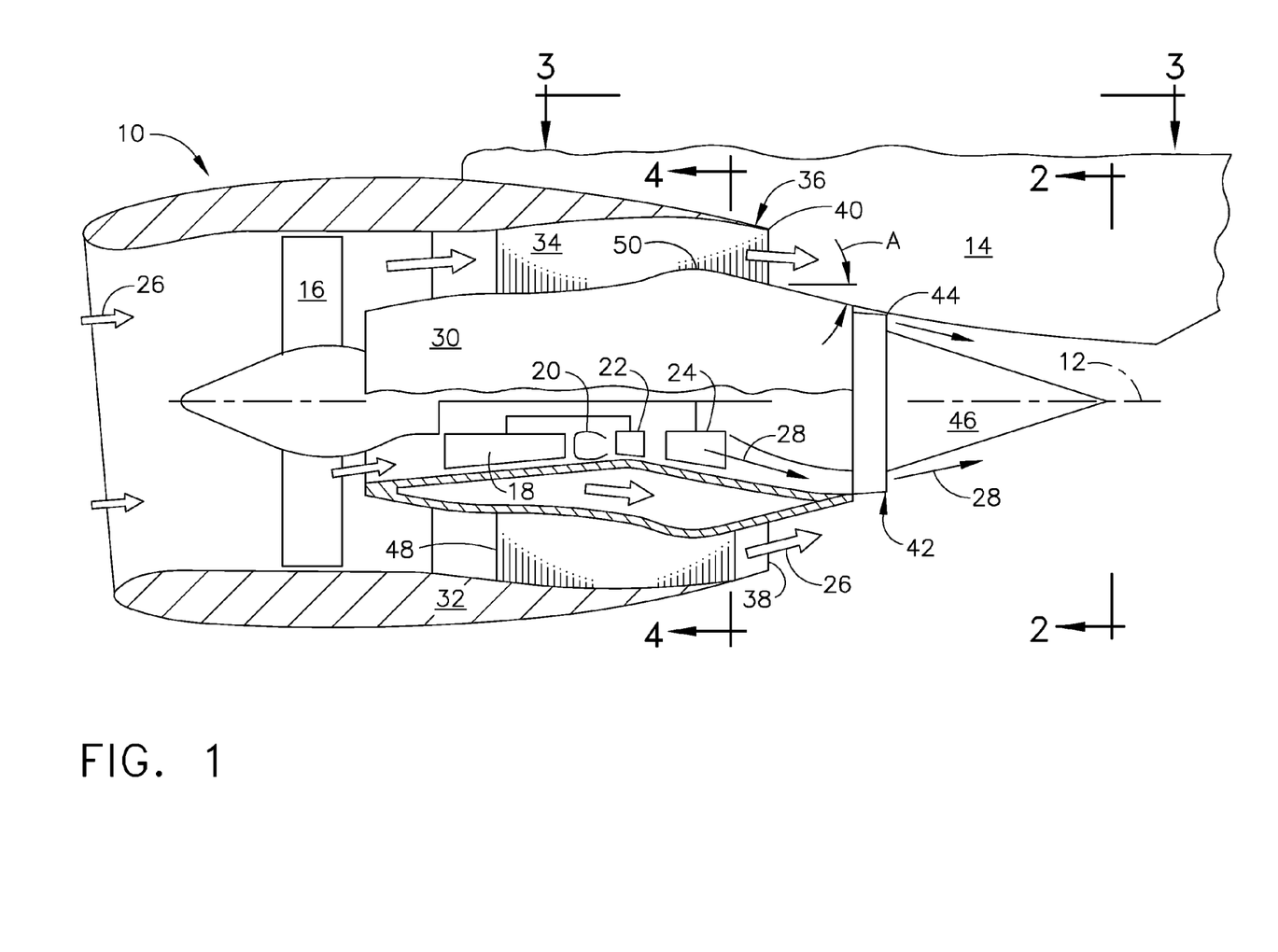
FIG. 1 is a partly sectional axial schematic view of an aircraft turbofan gas turbine engine having a pylon for being mounted to the wing of an aircraft.

Referring to the drawings wherein identical reference numerals denote the same elements throughout the various views, FIG. 1 illustrates schematically a turbofan aircraft gas turbine engine 10 which is generally axisymmetrical about an a longitudinal or axial centerline axis 12. The engine is specifically configured for being suspended vertically by a pylon 14 to the wing of aircraft for powering the aircraft during flight.

The engine includes in serial flow communication a fan 16, compressor 18, combustor 20, high pressure turbine ("HPT") 22, and low pressure turbine ("LPT") 24. The rotors of the HPT 22 are joined by one shaft to the rotors of the compressor 18, and the rotors of the LPT 24 are joined by a second shaft to the rotor supporting the fan blades in the fan 16.

During operation, ambient air 26 enters the inlet of the engine and is pressurized in part by the fan 16, with an inner portion of the pressurized air then being channeled through the compressor 18 which further pressurizes the air which is then mixed with fuel in the combustor 20 for generating hot combustion gases 28. Energy is extracted from the gases in the HPT 22 for powering the compressor, and additional energy is extracted from the gases in the LPT 24 for powering the upstream fan 16.

An annular core cowl 30 surrounds the components of the core engine aft of the fan 16 and is spaced radially inwardly from the inner surface of the surrounding fan nacelle 32 and defines an annular fan flow duct 34 through which the pressurized fan air bypasses the core engine for producing a majority of the propulsion thrust.

The outer surface of the core cowl defines an inner shell, also designated 30, which provides a radially inner boundary for the fan duct 34, with its radially outer boundary being provided by the inner surface of the surrounding nacelle which defines a corresponding outer shell, also designated 32.

The fan duct 34 begins at the forward end of the core cowl behind the fan 16, and terminates in an annular fan exhaust nozzle 36 surrounding the aft end of the core cowl. The fan nozzle 36 has an annular outlet 38 at the aft trailing edge 40 of the fan nacelle. In the exemplary embodiment illustrated in FIG. 1, the fan outlet 38 is coplanar in a single vertical plane at a common axial position in accordance with conventional practice.

The core engine terminates in an annular core exhaust nozzle 42 at the trailing edge 44 of the core cowl.

An annular centerbody or plug 46 is disposed coaxially inside the core nozzle 42 and defines the inner flow boundary thereof, with the outer flow boundary being defined the inner surface of the core cowl.

During operation, air pressurized by the fan 16 bypasses the core engine through the fan duct 34 and is discharged through the fan nozzle 36 for producing a majority of the propulsion thrust. Correspondingly, the spent combustion gases 28 are discharged from the core engine through the core nozzle 42 aft of the fan nozzle 36 and radially inwardly thereof.

However, as described above in the Background section, the pylon 14 includes a portion located at the top of the fan duct 34 which interrupts the circumferential continuity thereof to the nacelle trailing edge 40.

Correspondingly, a lower bifurcation or longitudinal beam 48 interrupts the circumferential continuity of the lower portion of the fan duct 34 terminating just short of the nacelle trailing edge 40.

Figure 2:
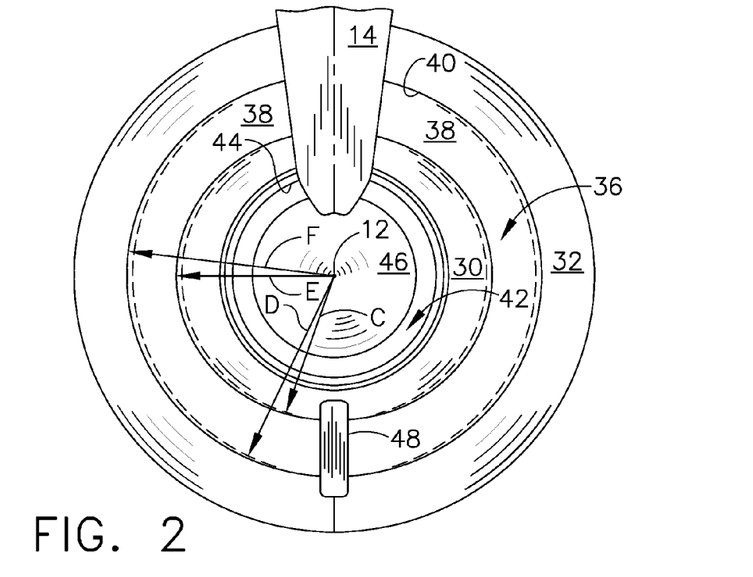
FIG. 2 is a aft-facing-forward radial elevational view of the fan and core exhaust nozzles illustrated in FIG. 1 and taken along line 2-2.

FIG. 2 illustrates the aft end of the engine in vertical elevational view in which the pylon 14 is located at the twelve o'clock position of the engine, with the lower beam 48 being located at the diametrically opposite six o'clock position of the engine. In this way, the fan duct 34 may be configured in the two C-duct half portions for allowing clamshell opening thereof in a conventional manner.

The pylon 14 and beam 48 therefore block or interrupt the fan duct 34 at the twelve and six o'clock positions, and so bifurcate the otherwise fully annular fan duct 34 into laterally or horizontally opposite C-duct portions which correspondingly affects the velocity and pressure distributions of the pressurized fan air 26 being discharged through the fan duct during operation.

Figure 3:
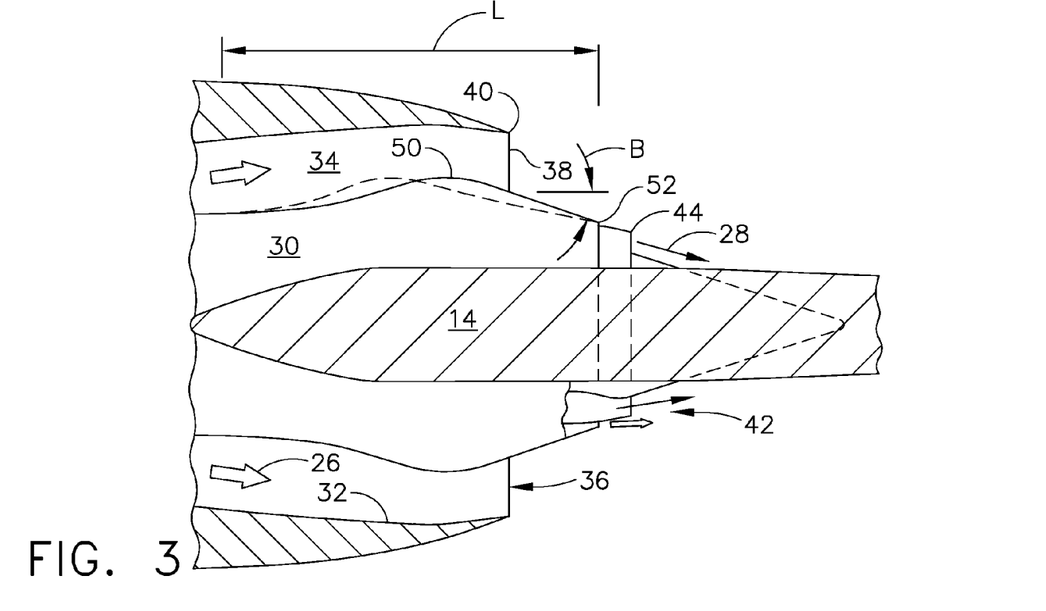
FIG. 3 is a axial sectional top plan view of the fan and core exhaust nozzles of the engine illustrated in FIG. 1 and taken along line 3-3.

FIG. 3 is a top sectional view through the fan nozzle 36 in a horizontal plane extending through the three o'clock and nine o'clock positions of the duct and illustrate the unobstructed portions of the fan duct 34 circumferentially midway between the upper pylon and lower beam.

FIGS. 1 and 3 illustrate the typical axial contours or profiles of the core cowl disposed coaxially inside the surrounding nacelle. In particular, the inner shell defined by the outer surface of the core cowl 30 is generally conical in surface of revolution and is disposed coaxially inside the inner surface of the surrounding nacelle 32 that defines the outer shell which is also a conical surface of the revolution.

The inner shell 30 commences well upstream of the fan outlet 38 immediately aft of the fan 16 itself, and terminates well aft of the fan outlet 38 in its trailing edge 44 which defines the corresponding outlet of the core nozzle 42.

The inner shell 30 therefore varies in diameter relative to the centerline axis 12 of the engine both axially forward and aft of the fan outlet 38, with a conical profile decreasing in diameter aft of the fan outlet to the core nozzle 42, with the centerbody 46 also being conical and decreasing in diameter to its trailing edge in conventional practice.

As initially shown in FIGS. 1 and 2, the aft portion of the inner shell 30 between the fan and core nozzles is typically an axially straight cone having a corresponding axial slope or cone angle A,B. In conventional practice, the inner shell 30 would be defined as a surface of revolution around the centerline axis, with a constant diameter in each radial plane and with a circular circumference, and the cone angle would be constant circumferentially around the perimeter.

Correspondingly, a conventional fan nozzle is also axisymmetrical about the centerline axis 12 of the engine with its trailing edge similarly defining a circular perimeter, with the fan outlet also being circular with a constant differential radius between the trailing edge of the nacelle and the outer surface of the core cowl.

However, as described above, the upper pylon 14 and lower beam 48 illustrated in FIG. 2 bifurcate the circumferential continuity of the fan nozzle 36 and correspondingly affect the uniformity of the pressure and velocity distributions of the pressurized air being discharged therefrom.

Accordingly, the core cowl 30 is locally modified from its conventional configuration so that the axial slope or cone angle A,B of the inner shell 30 may be preferentially varied circumferentially around its perimeter, including around the fan duct 34 itself, to preferentially alter the pressure and velocity distributions of the discharged fan air for increasing nozzle thrust coefficient and thereby nozzle efficiency and performance for correspondingly improving SFC.

The selective variation in slope angle of the inner shell 30 locally varies the three dimensional (3D) conical configuration of not only the inner shell 30 itself, but also the 3D configuration of the fan duct 34 defined in part thereby.

For example, in the vertical axial plane illustrated in FIG. 1, the cone angle A of the core cowl directly adjacent to or at the upper pylon and lower beam may have a locally minimum value based on conventional practice, such as 13 degrees.

From the pylon and beam, the cone angle, designated B, increases in magnitude or value circumferentially away from both the pylon 14 and beam 48 preferably symmetrically on laterally opposite sides of the fan nozzle 36.

As initially shown in FIGS. 1-3, the cone angle B has a locally maximum value of about 16.5 degrees on the laterally or horizontally opposite sides of the fan nozzle 36 at the three o'clock and nine o'clock positions thereof. The cone angle B then decreases in magnitude in circumferentially opposite directions from the maximum values at three and nine o'clock to the locally minimum values A at the opposite junctions of the fan nozzle with the upper pylon 14 at the twelve o'clock position and the lower beam at the six o'clock position.

In other words, each C-duct half of the fan nozzle 36 has a locally maximum value of the cone angle B located about circumferentially midway between the two locally minimum values of the cone angle A at the junctions with the pylon and beam.

Since the inner shell 30 is a 3D component, the variation in axial cone angle A,B circumferentially therearound extends both axially forward and aft of the fan nozzle outlet 38. This cone angle variation therefore affects the aerodynamic performance of the pressurized fan air 26 as it is being discharged through the fan nozzle 36 itself, as well as affects the pressurized fan air as it expands outside the fan nozzle as it continues to flow axially aft over the aft end of the core cowl.

But for the modified cone angle of the core cowl 30, FIGS. 1 and 3 illustrate the general configuration thereof in accordance with general practice. In particular, the inner shell 30 begins directly aft of the fan 16 and initially diverges aft in increasing diameter in the axially aft direction to a maximum diameter hump 50 disposed inside the fan duct 34 typically forward of the outlet 38. From the hump 50, the inner shell 30 converges aft in decreasing diameter to the trailing edge 44 of the core cowl, preferably in a straight axial section with a constant cone angle over a majority of the axial length therebetween.

As shown in FIG. 3, the slope angle B preferably varies circumferentially around the inner shell 30 both axially forward and axially aft of the maximum diameter hump 50 over a suitable axial length or range L thereof.

In each axial plane such as the horizontal plane illustrated in FIG. 3, the cone angle B preferably has a single or constant value, but varies circumferentially around the inner shell 30 between its locally minimum and maximum values as illustrated in FIG. 2.

Furthermore, the variable slope angle B preferably blends or tapers axially forward and aft of the hump 50 to a constant slope angle A circumferentially around the inner shell 30 at a correspondingly constant radius at the forward and aft ends of the axial range L of the variable slope modification of the core cowl.

For example, the variable slope range L shown in FIG. 3 may commence well aft of the fan 16 and suitably upstream of the hump 50 for maximizing aerodynamic performance over the full axial length of the fan duct 34 itself.

Correspondingly, the variable slope range L may terminate either at the trailing edge 44 of the inner shell itself or suitably upstream therefrom, such as for example at the annular vent 52 located slightly upstream from the trailing edge 44 through which purge air is conveniently vented from inside the core cowl during operation.

One effect of the varying slope angle B is the corresponding variation in local radius or diameter of the inner shell 30 circumferentially around the fan nozzle. FIG. 2 is a radial elevation view of the discharge end of the turbofan engine, and illustrates the horizontally oval or elliptical configuration of the inner shell 30 due to the preferred variation in slope angle B disclosed above.

The inner shell 30 has a locally minimum radius C from the centerline axis 12 which is suitably less than the corresponding minimum radius D of the outer shell 32, the difference of which defines the local radial height of the fan nozzle 36 at any particular axial location along the centerline axis 12.

Figure 4:
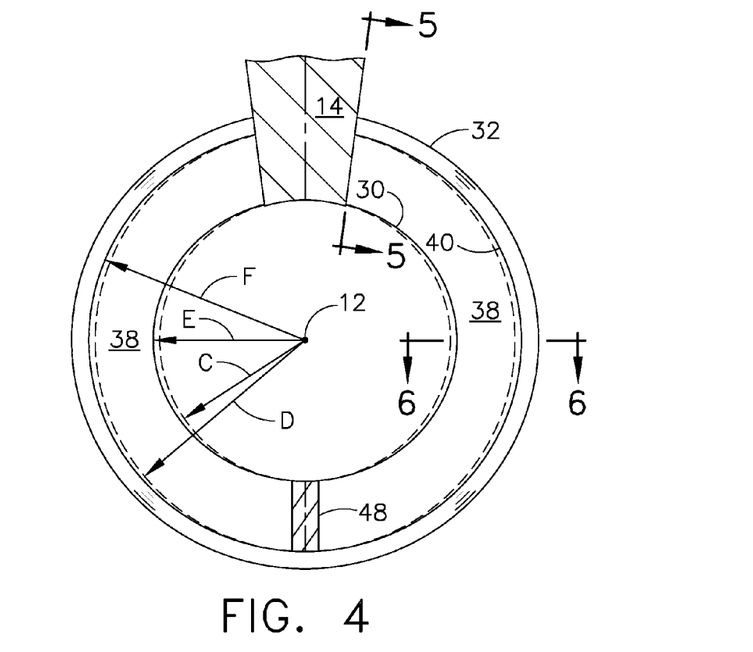
FIG. 4 is a partly sectional radial elevational view of an exemplary cross section through the fan nozzle illustrated in FIG. 1 and taken along line 4-4.

The minimum local radius C, or corresponding diameter 2C, for the inner shell is found at the two junctions thereof with the lower beam 48 as well as at the two junctions thereof with the upper pylon 14 as shown for the outlet view of the engine in FIG. 2, and for an upstream, axial representative view shown in FIG. 4.

As shown in FIGS. 2 and 4, the radius E, or diameter 2E, of the inner shell 30 increases from the minimum values (C) as the slope angle B increases in magnitude circumferentially opposite from the pylon 14 and beam 48. The radius E of the inner shell 30 has a locally maximum value corresponding in position with the maximum value of the slope angle B which occurs at the opposite three and nine o'clock positions of the nozzle generally midway circumferentially between the upper pylon and lower beam.

In FIGS. 2 and 4, the minimum radius C of the inner shell at any axial section occurs at the junctions with the pylon and beam and is additionally shown in dashed line in a constant radius circle for reference purposes.

The laterally increasing radius E of the inner shell 30 effects a slightly larger horizontal oval configuration thereof relative to the reference circular radius C.

The horizontal oval configuration of the inner shell 30 continues over the axial range L of the variable cone angle of the core cowl and blends away to constant radius circular sections of the core cowl at the opposite ends of the range L.

FIGS. 2 and 4 illustrate a preferred modification of the outer shell 32 to complement the modification of the inner shell 30 for adjusting the configuration of the fan nozzle 36 as the inner shell grows laterally in diameter. For example, the outer shell 32 preferably increases in local radius F as the slope angle B of the inner shell increases in magnitude circumferentially around the fan duct 34 in the common radial planes represented by FIG. 4 over the full axial range L of the variable cone angle.

In FIGS. 2 and 4, the minimum radius D of the outer shell 32 occurs at the two junctions with the lower beam 48 and the corresponding two junctions with the pylon 14. And, the minimum radius D of the outer shell is continued in a dashed circular line of constant radius for reference purposes.

As the slope angle B and radius E of the inner shell 30 increases circumferentially away from the pylon and beam, a portion of the flow area is lost in the fan duct 34. Accordingly, the radius F of the outer shell 32 bounding the fan duct 34 may be suitably increased for correspondingly locally increasing flow area of the fan duct to offset the local loss in flow area by the locally larger inner shell.

Figure 5:
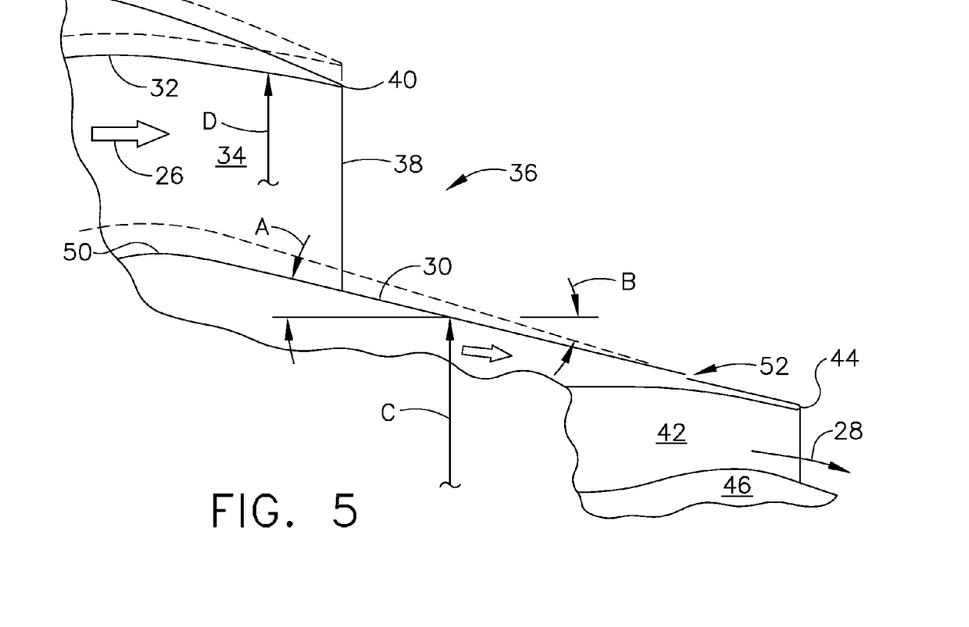
FIG. 5 is an enlarged axial sectional view through a portion of the fan and core exhaust nozzles illustrated in FIG. 4 and taken along line 5-5 at the vertical junction with the pylon.

FIG. 5 illustrates a representative axial cross section of the fan nozzle 36 at its one junction with the pylon 14, which is also representative of the opposite junction therewith, as well as with the two junctions with the lower beam 48. In this section, the inner shell 30 has the minimum cone angle A, and its radius C has minimum values over its axial extent, cooperating with minimum values of the radius D of the outer shell 32 bounding the fan duct 34. Shown in dashed line in FIG. 5 is the locally larger configuration of the fan nozzle corresponding with the increased values of the slope angle B of the inner shell.

Figure 6:
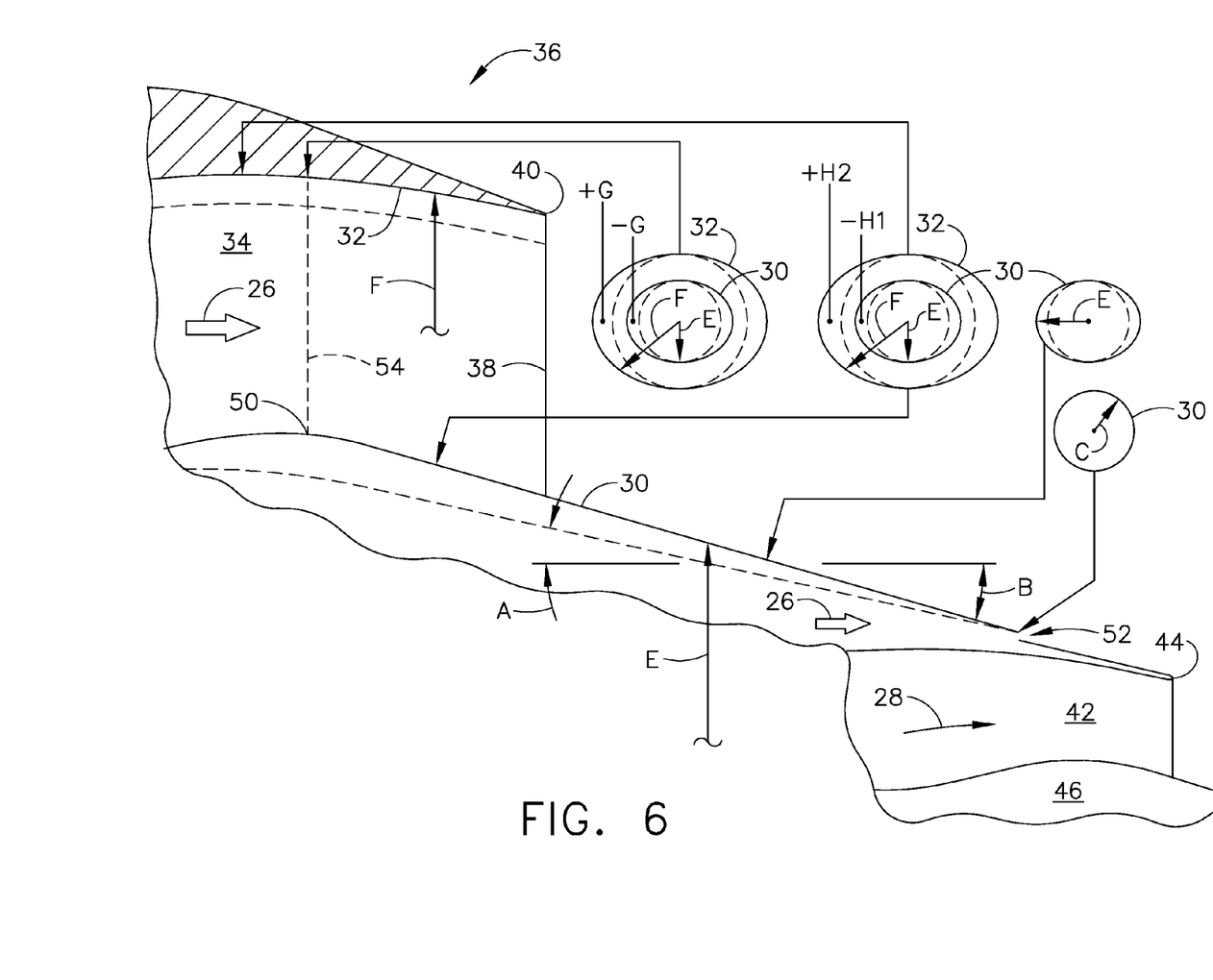
FIG. 6 is an enlarged axial sectional view of portions of the fan and core exhaust nozzles at the horizontal plane illustrated in FIG. 4 and taken along line 6-6

FIG. 6 illustrates in solid line a representative axial section of the fan nozzle 36 at the maximum value of the cone angle B and the corresponding larger radii E,F for the inner and outer shells 30,32 which radially bound the fan duct 34. Shown in dashed line in FIG. 6 is the minimum slope angle A and corresponding configurations of the inner and outer shells matching FIG. 5.

The fan duct 34 illustrated in FIG. 6 typically includes a throat 54 of minimum flow area which may occur at the outlet 38 itself, or suitably upstream therefrom at the maximum diameter hump 50 of the inner shell. The fan duct 34 therefore converges in a downstream aft direction to the throat 54 of minimum flow area, and then diverges therefrom to the fan outlet 38 in conventional practice.

Since the variable cone angle B of the inner shell 30 locally decreases flow area of the duct 34, the outer shell 32 is locally increased in radius for increasing flow area of the duct 34 to offset the loss from the locally larger inner shell.

In a preferred embodiment, the outer shell 32 increases in radius F circumferentially around the throat 54 so that the local area increase (+G) therefrom matches or equals in value the area decrease (−G) from the increasing radius E of the inner shell 30 in the radial plane of the throat 54 as the slope angle B correspondingly increases inside the throat 54.

FIG. 6 illustrates schematically corresponding axial sections of the inner and outer shells 30,32. In the radial plane of the throat 54, the area loss −G due to the increasing slope angle B and local radius E is offset identically by an increase in area +G due to locally increasing the radius F of the outer shell at the throat 54. In this way, the total flow area of the fan duct 34 in the radial plane of the throat 54 may remain unchanged in the non-axisymmetrical modification thereof relative to the desired flow area in a reference axisymmetrical fan nozzle.

The radial sections of the fan nozzle along the axial axis other than at the radial plane of the throat 54 may be otherwise modified for offsetting flow area decrease (−H1) from the locally larger inner shell with flow area increase (+H2) by locally enlarging the outer shell. Accordingly, the outer shell 32 may increase in radius F as the inner shell 30 increases in radius E circumferentially around the fan duct 34 for only partially offsetting the flow area change therefrom. In other words, the area increase +H2 need not be equal to the area decrease −H1, other than at the throat.

Since the variation in cone angle of the core cowl directly affects the configuration of the inner boundary of the fan nozzle 36, the outer boundary of the fan nozzle defined by the outer shell 32 may be correspondingly changed for maximizing aerodynamic performance of the fan nozzle not only at the throat 54 but also upstream therefrom as the variable slope angle blends away to a constant angle in the forward axisymmetrical portion of the core cowl, as well as at the axisymmetrical aft end of the core cowl.

For example, the aft portion of the core cowl 30 shown in FIG. 6 between the vent 52 and the trailing edge 44 preferably has a constant cone angle A of the original thirteen degrees for example, and is axisymmetrical over its entire axial length. In this way, maximum performance of the core nozzle 42 bound thereby may be maintained without degradation.

In this configuration, both the inner and outer shells 30,32 vary in contour or diameter 2E,2F, circumferentially around the fan duct 34 defined radially therebetween, and axially forward of the fan outlet 38. The inner shell 30 continues to vary in its diameter 2E aft of the fan outlet 38 to the vent 52 and just short of the trailing edge 44 of the core cowl where the variable slope terminates.

FIG. 3 illustrates in solid line the maximum slope angle B of the converging portion of the core cowl 30, and in dashed line the minimum slope angle configuration thereof over the range L. The inner and outer shells 30,32 therefore commence at constant diameters in axisymmetrical configurations at a forward end of the fan duct 34 forward of the axial range L, with the outlet shell 32 terminating in a circumferentially variable diameter at the trailing edge 40 thereof.

In contrast, the inner shell 30 continues its converging conical configuration and terminates in a circumferentially constant diameter at the trailing edge 44 thereof for providing an axisymmetrical core nozzle 42.

The resulting fan nozzle 36 illustrated in radial elevation in FIGS. 2 and 4 includes outer and inner shells 30,32 and flow duct 34 defined therebetween which are non-axisymmetric around the common centerline axis 12 of the nozzle 36. However, the outer and inner shells 30,32 and flow duct 34 therebetween are laterally or horizontally symmetric on opposite sides of the pylon 14 and beam 48 about the vertical line therebetween with matching or equal radii from the common axis 12.

In other words, the fan nozzle 36 illustrated in FIG. 2 is both horizontally and vertically symmetrical in this one embodiment thereof, and horizontally elongated in oval or elliptical profile sharing the common or single centerline axis 12.

The fan nozzle 36 may therefore be diametrically symmetrical along common diameters 2E,2F with equal values of each radius E,F on opposite sides thereof. The maximum diameters 2E,2F preferably occur in the horizontal plane normal to the vertical plane of the pylon and beam, with the minimum diameters 2C,2D occurring in the vertical plane at the junctions of the fan nozzle with the pylon and beam.

FIGS. 2 and 4 exemplify the distinctive horizontally oval fan nozzle 36 due to the circumferential increase in cone angle B from the locally minimum cone angle A at the vertical junctions with the upper and lower bifurcations 14, 48.

The fan nozzle 36 is defined by its inner and outer shells 30,32 which are locally larger in diameter on opposite lateral sides due to the local increase in cone angle over the desired axial range.

And, the local increase in cone angle of the inner shell 30 may suitably blend away to constant diameter cross sections at both forward and aft ends thereof, with the local increase in diameter of the outer shell 32 blending away upstream from the fan outlet.

The variable slope angle exhaust nozzle disclosed above is preferentially tailored to accommodate the obstructions to smooth exhaust flow in the fan nozzle due to the circumferential bifurcations effected by the pylon 14 and lower beam 48. The upstream portion of the core cowl may remain axisymmetrical in conventional fashion, with the cowl being locally modified where it affects aerodynamic performance of the surrounding fan nozzle.

The slope angle of the converging aft portion of the core cowl is suitably varied circumferentially for redistributing the fan exhaust around the nozzle with corresponding velocity and pressure distributions tailored for reducing aerodynamic losses for correspondingly increasing engine performance.

Aerodynamic pressure losses may be reduced by locally increasing the cone angle, and thusly locally increasing the aft convergence of the core cowl at the fan outlet which laterally widens the nozzle in the horizontal plane perpendicular to the vertical plane of the pylon and lower beam. The modified fan nozzle locally increases exhaust speed in the lateral plane of maximum slope angle, with the flow speeds decreasing therefrom to locally minimum values along both the upper pylon 14 and lower beam 48.

In this way pressure losses are reduced near the pylon and beam for improving thrust coefficient of the nozzle.

Since the inner shell continues to converge aft of the fan nozzle which terminates at its trailing edge 40, the variable slope angle B of the inner shell 30 also permits faster expansion of the discharged fan exhaust resulting in a locally higher static pressure aft of the fan outlet. This increased static pressure increases thrust and performance of the engine.

Figure 7:
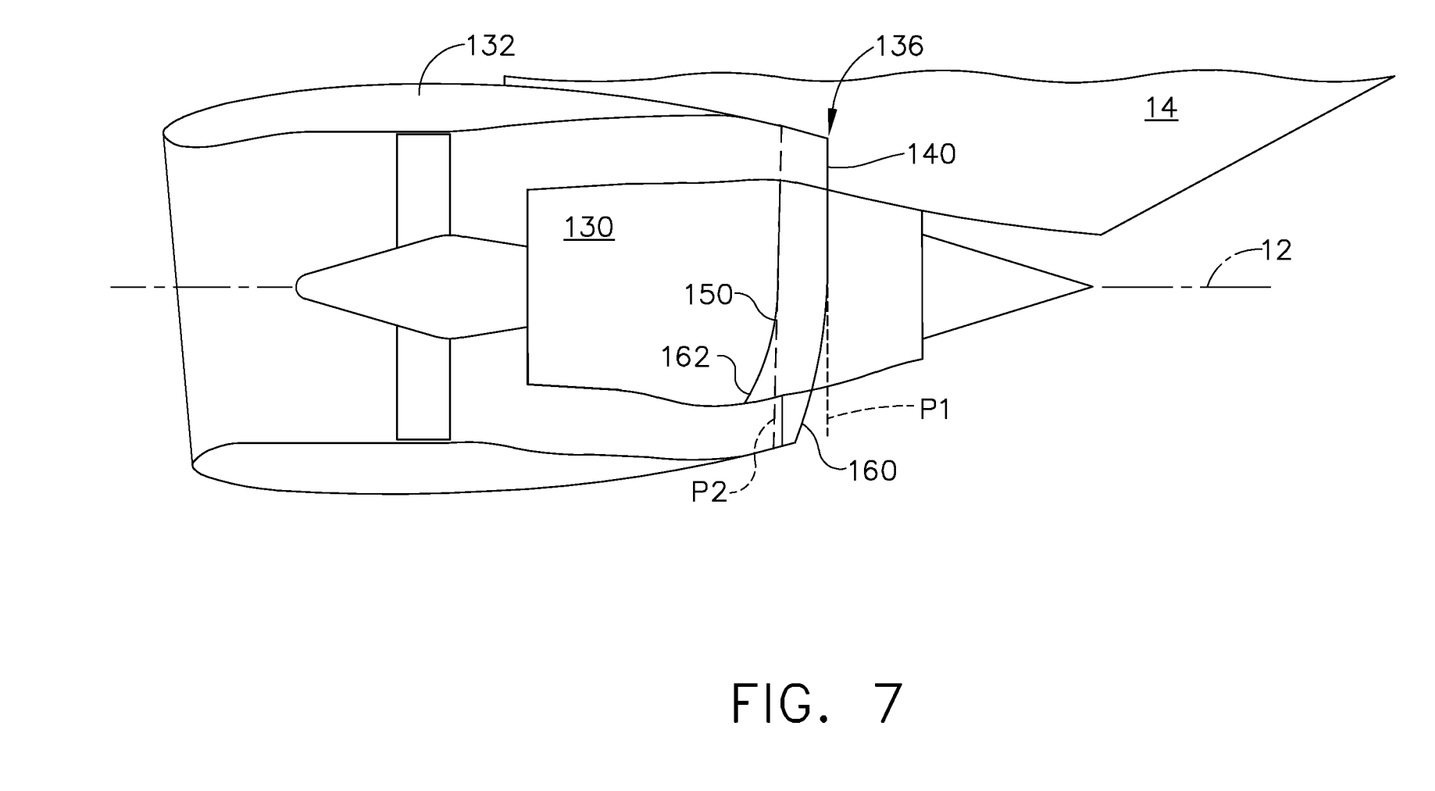
FIG. 7 is a schematic side view of a fan exhaust nozzle having a vertically non-coplanar configuration
Figure 8:
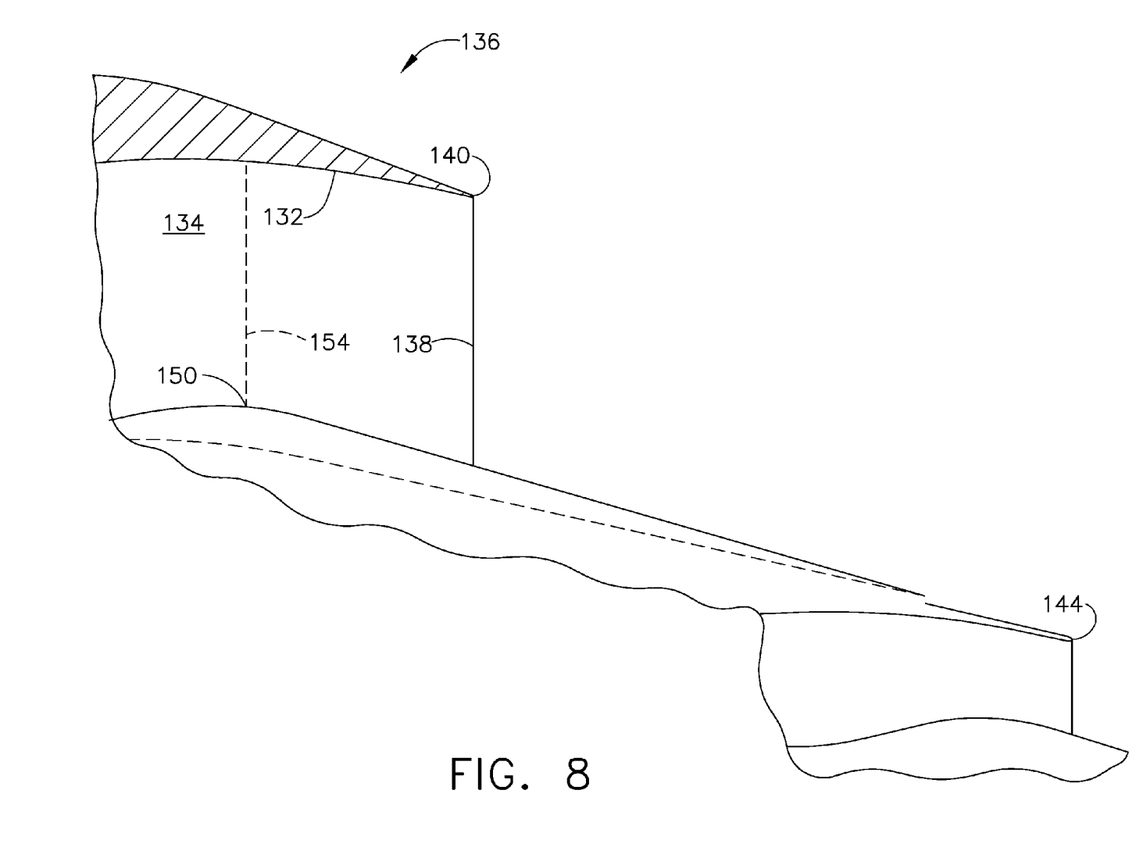
FIG. 8 is a half-sectional view of a portion of the fan nozzle shown in FIG. 7.
Figure 9:
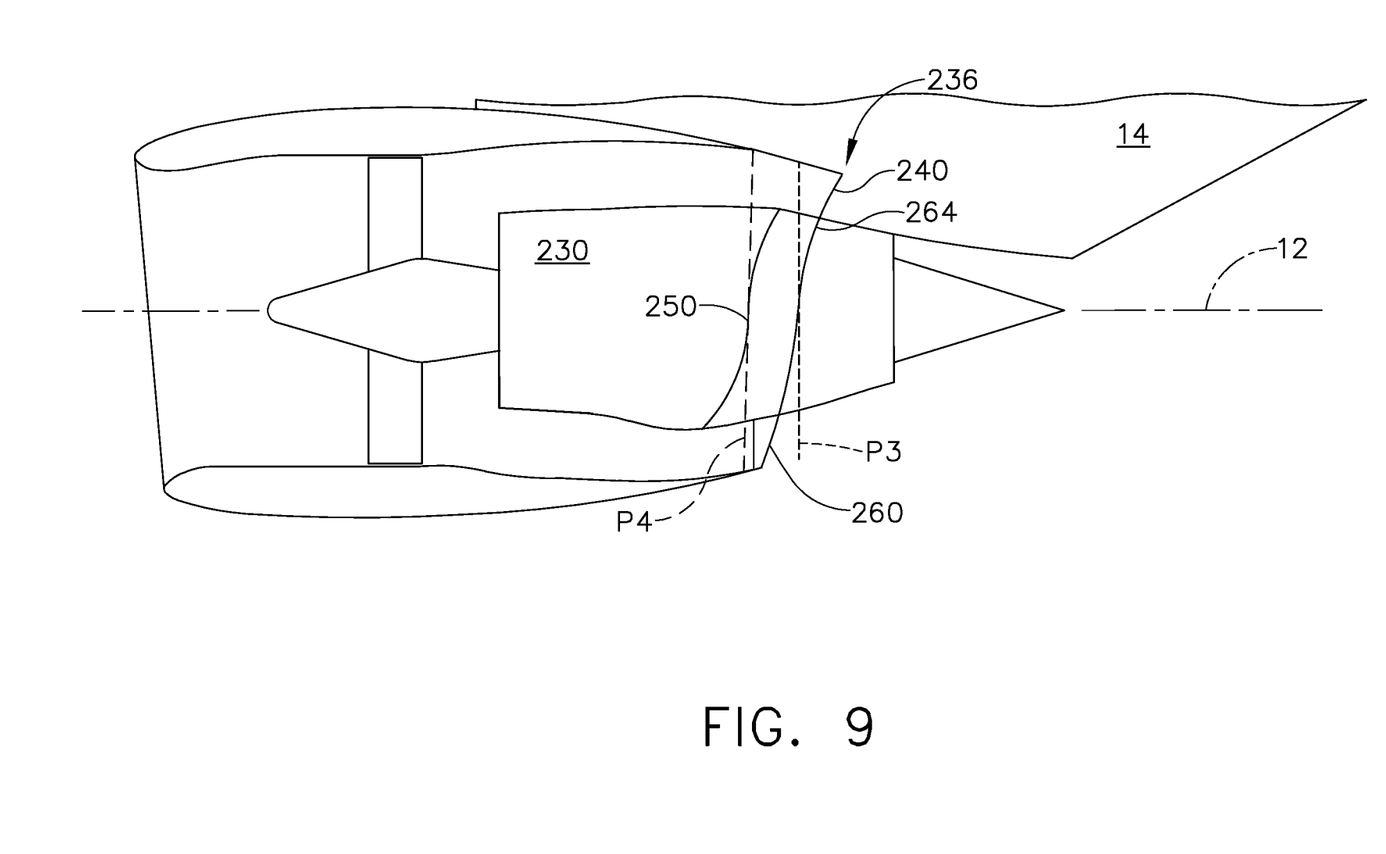
FIG. 9 is a schematic side view of a fan exhaust nozzle having a vertically non-coplanar configuration.

As shown in FIGS. 1-6 above, the fan outlet 38 is coplanar in a single vertical plane at a common axial position in accordance with conventional practice. As used herein the term "vertical plane" refers to a plane which is perpendicular or geometrically normal to the centerline axis 12, regardless of the actual orientation of the plane relative to the Earth or other external frame of reference. However, it is also possible to implement the fan outlet 38 with a shape that is not coplanar in a single vertical plane. This feature may be referred to generally as a "vertically non-coplanar" fan exhaust nozzle. FIGS. 7-9 illustrate examples of such implementations.

FIG. 7 shows a fan exhaust nozzle 136 comprising portions of an annular core cowl 130 which is spaced radially inwardly from an inner surface of a surrounding fan nacelle 132. The overall structure is similar to the exhaust nozzle 36 described above; portions of the exhaust nozzle 136 not explicitly described may be considered to be identical to those described above.

The fan nozzle 136 has a trailing edge 140. At least a portion of the trailing edge 140 deviates from an imaginary vertical coplanar plane used for reference, labeled "P1". In the example shown in FIG. 7, the majority of the trailing edge 140 lies in the plane P1. A lower portion 160 of the trailing edge 140, for example a portion from approximately the five o'clock position to the seven o'clock position when viewed in rear elevation, is shifted or displaced axially forward from the plane P1. The location of maximum displacement occurs at approximately the six o'clock position. The displacement fades or tapers away at circumferential positions away from the location of maximum displacement. For example, the displacement is shown as being minimal or non-existent at approximately the three o'clock through nine o'clock positions. The rate of taper, or taper profile, may be a linear or non-linear function.

As best seen in FIG. 8, an annular fan flow duct 134 is defined between the fan nacelle 132 and the core cowl 130. The core cowl 130 begins directly aft of the fan 16 (FIG. 7) and initially diverges aft in increasing diameter in the axially aft direction to a maximum diameter hump 150 disposed inside the fan duct 134 typically forward of the outlet 138. From the hump 150, the core cowl 130 converges aft in decreasing diameter to a trailing edge 144 of the core cowl 130. The fan duct 134 includes a throat 154 of minimum flow area which may occur at the maximum diameter hump 150 of the core cowl 130. The fan duct 134 therefore converges in a downstream aft direction to the throat 154 of minimum flow area, and then diverges therefrom to the fan outlet 138 in conventional practice.

The shape of the fan duct 134, as defined by the dimensional relationship of the core cowl 130 to the fan nacelle 132, defines the operating characteristics of the fan nozzle 136, primarily its pressure ratio. In accordance with conventional practice, the nozzle 136 may be designed to expand the airflow to a specific condition (e.g. near ambient pressure) at the trailing edge 140 and to have as little pressure loss as possible, when operating at a specific design condition, for example cruise flight. In order to maintain a selected nozzle performance, the selected dimensional relationship may be maintained around the circumference of the fan nozzle 136. In other words, the fan nozzle 136 may be conceived of as a circumferential array of identical half-sections as seen in FIG. 8, with some of the sections being axially shifted relative to other half-sections.

To maintain the selected dimensional relationship, the core cowl 130 accordingly may incorporate a shifting or displacement corresponding to the shifting or displacement of the trailing edge 140. In the example shown in FIG. 7, the majority of the hump 150 lies in an imaginary vertical coplanar plane, used for reference and labeled "P2". A lower portion 162 of the hump 150, for example a portion from approximately the five o'clock position to the seven o'clock position, is shifted or displaced axially forward from the plane P2. The location of maximum displacement occurs at approximately the six o'clock position. The displacement fades or tapers away at positions away from the location of maximum displacement. For example, the displacement is shown as being minimal or non-existent at approximately the three o'clock through nine o'clock positions. The rate of taper, or taper profile, may be a linear or non-linear function. This displacement of the hump 150 corresponding to the displacement of the trailing edge 140 may also be described as the hump 150 maintaining a constant axial distance from the trailing edge 140 around the circumference of the fan exhaust nozzle 136; that is, the axial distance is the same for any given half-section around the circumference of the fan exhaust nozzle 136.

FIG. 9 shows another alternative fan nozzle 236 with a trailing edge 240. Like the fan nozzle 136 shown in FIG. 7, at least a portion of the trailing edge 240 deviates from an imaginary vertical coplanar plane labeled "P3". In the example shown in FIG. 9, the majority of the trailing edge 240 lies in the plane P3. An upper portion 264 of the trailing edge 240, for example a portion from approximately the ten o'clock position to the one o'clock position, is shifted or displaced axially aft from the plane P3. The location of maximum displacement occurs at approximately the twelve o'clock position, where the trailing edge 240 adjoins the pylon 14. The displacement fades or tapers away at positions away from the location of maximum displacement. The rate of taper, or taper profile, may be a linear or non-linear function. A lower portion 260 of the trailing edge 240, for example a portion from approximately the five o'clock position to the seven o'clock position, is shifted or displaced axially forward from the plane P3. The location of maximum displacement occurs at approximately the six o'clock position. The displacement fades tapers away at positions away from the location of maximum displacement. The rate of taper, or taper profile, may be a linear or non-linear function. A hump 250 of the core cowl 230 may incorporate axial displacement corresponding to the displacement of the trailing edge 240 as described above for the core cowl 130.

The non-coplanar nozzle described above can improve nozzle efficiency as compared to the prior art. In particular, shifting the portion of the nozzle immediately adjoining the pylon axially aft reduces the total surface area which is scrubbed by high-velocity exhaust gases from the fan nozzle, and therefore reduce surface friction drag losses. The shifting of the cross-sections may be determined empirically for a specific application, for example using computational fluid dynamics ("CFD") software to model flow through the fan nozzle.

The improved fan nozzle disclosed above, including the vertically non-coplanar feature or the variable slope angle feature individually or together, can significantly improve specific fuel consumption of the engine which is a paramount objective in the design of modern aircraft engines.

The foregoing has described a fan nozzle for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A turbofan exhaust nozzle comprising:
a conical inner shell disposed coaxially inside a surrounding outer shell to define an annular flow duct therebetween terminating in an outlet at a trailing edge of the outer shell, the conical inner shell terminating in a trailing edge aft of the outlet, wherein the conical inner shell diverges aft inside the annular flow duct to a hump and then converges aft to the trailing edge aft of the outlet thereof, and an axial position of the hump vanes circumferentially therearound corresponding to an axial position of the trailing edge of the outer shell; and
a pylon interrupting circumferentially the annular flow duct, wherein at least a portion of the trailing edge of the outer shell is vertically non-coplanar.

2. The turbofan exhaust nozzle of claim 1 wherein a lower portion of the trailing edge of the outer shell located diametrically opposite the pylon is displaced axially upstream relative to a remainder of the trailing edge of the outer shell.

3. The turbofan exhaust nozzle of claim 2 wherein a displacement tapers away at positions away from the location of a maximum displacement.

4. The turbofan exhaust nozzle of claim 2 wherein an upper portion of the trailing edge immediately adjoining the pylon is shifted axially downstream relative to the remainder of the trailing edge.

5. The turbofan exhaust nozzle of claim 1 wherein an upper portion of the trailing edge immediately adjoining the pylon is shifted axially downstream relative to a remainder of the trailing edge.

6. The turbofan exhaust nozzle of claim 5 wherein a displacement tapers away at positions away from the location of a maximum displacement.

7. The turbofan exhaust nozzle of claim 1 wherein the axial position of the hump maintains a constant axial distance from the trailing edge around the circumference of a fan nozzle.

8. A turbofan exhaust nozzle comprising:
a conical inner shell disposed coaxially inside a surrounding outer shell to define an annular flow duct therebetween terminating in an outlet at a trailing edge of the outer shell, the conical inner shell terminating in a trailing edge aft of the outlet wherein the conical inner shell diverges aft inside the annular flow duct to a hump and then converges aft to the trailing edge aft of the outlet thereof; and an axial position of the hump varies circumferentially therearound corresponding to an axial position of the trailing edge of the outer shell; and
a pylon interrupting circumferentially the annular flow duct, wherein an axial position of the trailing edge of the outer shell varies circumferentially therearound.

9. The turbofan exhaust nozzle of claim 8 wherein a lower portion of the trailing edge of the outer shell located diametrically opposite the pylon is displaced axially upstream relative to a remainder of the trailing edge of the outer shell.

10. The turbofan exhaust nozzle of claim 9 wherein a displacement tapers away at positions away from the location of a maximum displacement.

11. The turbofan exhaust nozzle of claim 8 wherein an upper portion of the trailing edge immediately adjoining the pylon is shifted axially downstream relative to a remainder of the trailing edge.

12. The turbofan exhaust nozzle of claim 11 wherein a displacement tapers away at positions away from the location of a maximum displacement.

13. The turbofan exhaust nozzle of claim 9 wherein an upper portion of the trailing edge immediately adjoining the pylon is shifted axially downstream relative to the remainder of the trailing edge.

14. The turbofan exhaust nozzle of claim 8 wherein the axial position of the hump maintains a constant axial distance from the trailing edge around the circumference of a fan nozzle.

* * * * *